United States Patent
Nwoke

(10) Patent No.: US 8,579,749 B1
(45) Date of Patent: Nov. 12, 2013

(54) TRANSMISSION DEVICE

(75) Inventor: Ugochukwu Shedrach Nwoke, Columbus, OH (US)

(73) Assignee: Ugo S. Nwoke, Blacklick, OH (US)

( * ) Notice: Subject to any disclaimer, the term of this patent is extended or adjusted under 35 U.S.C. 154(b) by 235 days.

(21) Appl. No.: 12/930,389

(22) Filed: Jan. 5, 2011

Related U.S. Application Data

(60) Provisional application No. 61/292,447, filed on Jan. 5, 2010.

(51) Int. Cl.
  *F16H 3/72* (2006.01)
(52) U.S. Cl.
  USPC ............................................. 475/5; 475/330
(58) Field of Classification Search
  USPC .......................................... 475/5, 8, 329, 330
  See application file for complete search history.

(56) References Cited

U.S. PATENT DOCUMENTS

| | | | |
|---|---|---|---|
| 8,167,754 B2 * | 5/2012 | Phillips | 475/5 |
| 2011/0086737 A1 * | 4/2011 | Phillips | 475/5 |
| 2011/0230291 A1 * | 9/2011 | Phillips | 475/5 |

* cited by examiner

*Primary Examiner* — David D Le
*Assistant Examiner* — Derek D Knight
(74) *Attorney, Agent, or Firm* — Warn Partners P.C.; Ernest Helms

(57) ABSTRACT

A transmission device 100 with an input 101 and output planetary set 102 connected by two co-axial shafts 110 and 111 such that the combination of a gear and speed ratio is possible without interrupting the torque path between the engine or prime mover and the wheel using an electromechanical control apparatus comprising of two motor generators 117 and 118 that also provides electric torque to complement the mechanical torque. The current powerflow is increased by the planetary configuration and continuous power regeneration during torque and inertia phases. Where the carrier 108 can engage the engine to the transmission 100 and where the hybrid torque is transmitted by engaging the vehicle load to the transmission.

3 Claims, 1 Drawing Sheet

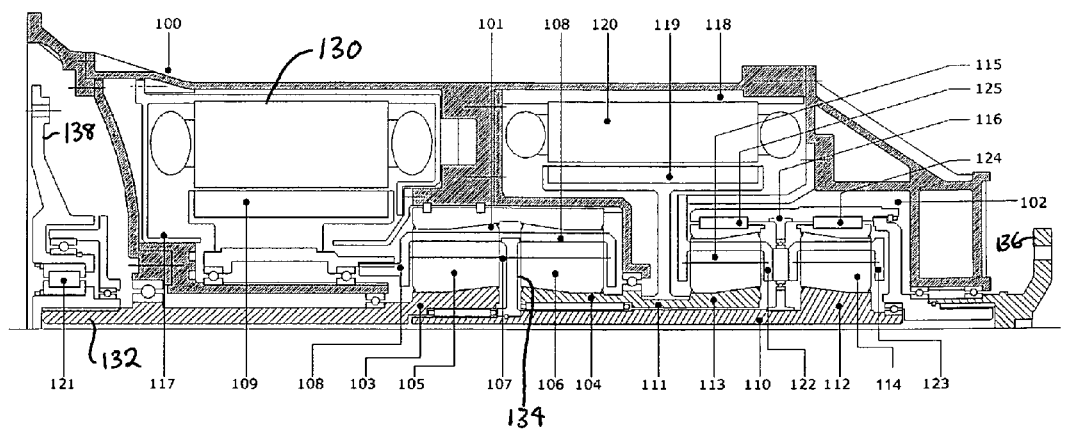

TRANSMISSION DEVICE

CROSS-REFERENCE TO RELATED APPLICATIONS

This application is filed to claim prior art date of provisional patent application No. 61/292,447, filed in Jan. 5, 2010.

TECHNICAL FIELD

The present invention relates to automotive vehicle transmissions, more particularly, the present invention relates to a continuously variable transmission (CVT). Even more particularly the present invention relates to CVT that can be used in hybrid electric vehicles.

TECHNICAL SUMMARY

This application describes a transmission that generates the hybrid torque output from a single planetary gear set and an expansive speed ratio. As there are multiple operating modes, this document will focus on two core kinematic arrangements defined as parallel or Mode 1 and full or mode 2.

The current inventive transmission device eliminates the need for multiple independent gears and clutches plus associated controls by using a single geometrical ratio in a planetary configuration. The above configuration allows several torque transmission mode to augments the torque from the fixed single gear ratio to an infinite speed ratio with an electromechanical control. As a result, the torque output from the prime mover or the internal combustion engine (ICE) is continuous without interruptions that usually occur between gears and can run at a lower rev per minute (rpm) due to the additional torque input from the electromechanical control.

The present invention can be used for a hybrid electric vehicle transmission having an input sun gear constantly meshed to a multiple set of planet gears freely rotating on its axis or revolving co-axially to the sun gear. Wherein, the input sun gear is incorporated with a sprag clutch to disengage the transmission from the engine or prime mover.

Each planet gear is associated with a second set of planet gears by a planet pinion which is secured to a planet carrier. The second set of planet gears are constantly meshed to a second sun gear called the output sun gear which is forged to a shaft that extends to a second planetary set for torque output to the wheels. The planet carrier is forged to a second shaft co-axial to the first shaft and rotates independently from it.

In one embodiment, each shaft is incorporated with sun gears which terminates in the second planetary set or output planetary set. Each sun gear is meshed to a separate set of planet gears secured to planet carriers which can be fixed such that the carrier is stationary or rotational when disengaged from torque transmission. The planet gears will engage or disengage depending on the torque load between the engine and the vehicle weight. The planet gears are constantly meshed to both shaft sun gears and a ring gear.

In one embodiment, the gears are constantly engaged during torque and inertia phase of transmission which eliminates the need for conventional clutch activity. At torque phase, the input from the engine passes through the input or first sun gear to turn the first and second planet gears whether they are rotating at a stationary axis position or revolving co-axially in relation to the first sun gear. The first and second planet gear's torque output passes through the output sun gear to the associated output shaft and transmits the torque to a differential through the output planetary set. The same turning response from the second shaft occurs especially when the carrier it is associated with, begins to rotate on its axis as a result of the rotating torque from the rotor it is connected to. The rotor is associated with an electromechanical control in form of a motor/generator (MG) which controls its rotation. When the torque input from the engine or the rotor turns the shafts, this is considered a torque phase since the output is used to move the vehicle.

When the vehicle speed slows down to stop, the residual torque can keep turning the carrier and rotor, regenerating current back to either a capacitor or battery.

TECHNICAL SOLUTION

A preferred approach to the solution is to use a planetary gear configuration due to the ability of obtaining multiple ratios from the same unit and an electromechanical control system that augments gear ratio beyond the mechanical limits of the set ratio.

Wherein, one planetary set is for torque input and the second is for torque output. The torque input planetary set is designed to transmit torque input from two power source such as an internal combustion engine (ICE) and motor generator (MG).

The input sun gear transmits mechanical torque from the engine which rotates the planet gears. There are two sets of planet gears on each pinion such that the rotation of the planet gears meshed to the input sun gear would turn the second set of planet gears on the same pinion axis so that a second sun gear or output sun gear meshed to the second planet gears, is rotated at the desired speed.

The full ratio between the input sun gear and the planet gears is realized when the carrier is held at a stationary position relative to its axis.

In a given embodiment, the carrier is associated to an electromechanical control system by a rotor which turns co-axially with the sun gear when electric current passes through it. When this happens, the carrier will rotate displacing the planet gears to revolving round the axis of the sun gear. The carrier is forged into a second shaft which independently rotates from the first shaft associated with the output sun gear.

As preferred in this embodiment but not limited to it, both shafts are incorporated with gears at the second end which meshes to a multiple set of planet gears. Torque input from the output sun gears turns the planet gears which are held in position by a carrier. Unlike the carrier in the input planetary gear set, the carriers in the output planetary set is stationary to engage the planet gears to the ring gear and rotates to disengage the planet gear from transmitting torque to the same ring gear.

In one embodiment, the carriers in the output planetary set will rotate freely to disengage or held stationary to engage the planet gears by either incorporating a sprag clutch sandwiched between the outer ring gear and the planet gears or an electromechanical control Wherein, the engagement using a sprag clutch is dependent on the acting torque load which locks the clutch and prevents the carrier from rotating on it axis.

In one embodiment, during deceleration, the slowing carrier speed in the input planetary set in accordance with the reducing vehicle speed can regenerate current back to an energy storage unit as the transmission tries to get rid of the inertia torque. This would normally happen during a sudden drop in speed as the MG on the output shaft, becomes more active in the torque transmitted while the carrier returns to a stationary position.

In one embodiment, in a reverse maneuver, the carrier rotation in the input planetary set is reversed by the MG to engage the output planetary set in the other direction as the sprag is a two way clutch. The engine can also be disconnected using a one way clutch between the input sun gear and an input member during this maneuver.

LIST OF FIGURES

FIG. 1, Cross section of an embodiment of the present invention.

INVENTION DESCRIPTION

The transmission device described below is a preferred embodiment of the invention and not limited to it as illustrated in FIG. 1. The same numerical reference will be used for the same or like parts of the embodiments.

The transmission device is a unit integrated to the vehicle powertrain wherein torque input from an ICE (internal combustion engine) or electric torque, is transmitted through two sets of planetary gears connected by two co-axial shafts.

Wherein, one planet set is used for torque intake either through the input sun gear and the carrier and the second planetary set is used for torque output mainly through a ring gear member.

The ICE via a one way sring clutch 121 powers an input shaft 132. As preferred in this embodiment but not limited to it, the torque through the first sun gear is from the engine (not shown) while the torque input from the first carrier 108 is from the electromechanical control system via a motor generator (MG) 109, 130. Wherein, the electric torque acting on a rotor 109 associated with a carrier 108 will rotate it in the desired direction and speed.

As preferred in this embodiment but not limited to it, a transmission device 100 with two planetary sets, input 101 and output 102 sets wherein, the input set 101 comprises of two sun gears, an input or first sun gear 103 and an output or second sun gear 104. The first sun gear 103 transmits torque through a set of first and second planet gears 105 & 106 that are connected and rotatively mounted by a single pinion 107. The second planet gear 106 is constantly meshed with and rotates on the second sun gear 104. The first planet pinion 107 is secured in position and connected with the first planet carrier 108 wherein one member of the first carrier 108 is torsionally connected to the electromechanical control via the first rotor 109. The carrier 108 has a stem 134 connected with a second intermediate shaft 110. When the first carrier 108 is held to prevent it from rotating on its axis, the torque ratio between the first sun gear 103 and the first and second planet gears 105 & 106 is peaked.

As preferred in the present embodiment but not limited to it, as the first carrier 108 begins to rotate, the first and second planet gears 105 & 106 are displaced to revolve co-axially with both sun gears 103 and 104 and the first carrier 108. The rotation of the first carrier 108 is caused by the rotation of the rotor 109 within the first stator 130. As the carrier 108 continues to rotate, the second intermediate shaft 110 rotates co-axially with the carrier 108.

Wherein, the second sun gear 104 is connected to a first intermediate shaft 111 such that the torque is transmitted to the output planetary set 102. Intermediate shafts 110 and 111, terminate with third and fourth sun gears 113 and 112 in the output planetary set 102 such that torque transmitted through the set of independent third and fourth planet gears 115 and 114 at different torque load and vehicle speed intervals through the ring gear 116 to a differential (not shown) via an output shaft 134.

As mentioned previously, the transmission 100 has two separate planetary sets 101 and 102. The first carrier 108 in the input set 101 can be held stationary such that torque from the prime mover or ICE passes through the first sun gear 103 and the first and second planet gears 105 and 106 to the third sun gear 113 so that the first intermediate shaft 111 rotates the third sun gear 113 in the output planetary set 102. The third sun gear 113 at the desired speed interval will rotate associated third planet gears 115 it is meshed to which will engage and rotate the ring gear 116 and output shaft 134.

First electromotive rotor 109 is torsionally connected to the first carrier 108. Rotor 109 is part of a motor generator (MG) module 117. Rotor 109 electrically interacts with a stator 130. A second MG module 118 has an electromotive rotor 119 torsionally connected, is associated with the first intermediate shaft 111 such that the rotation of the intermediate shaft 111 causes co-axial rotation of the rotor 119. The above can be used to generate electric current in a stator 120 which can pass to a vehicle energy storage unit such as a capacitor or battery.

When the first carrier 108 in the planetary set 101 begins to rotate on its axis in relation to the torque from the rotor 109 such that the rotating speed and torque acting on a second intermediate shaft 110 overlaps the torque and associated speed acting on the first intermediate shaft 111. The above noted action transfers the torque to the associated third planet gears 115 which will engage the ring gear 116 (via a one-way sprag clutch 125 and the ring gear 116 and output shaft 134) to connect the transmission to the differential (not shown).

Continued rotation of the first carrier 108 and second intermediate shaft 110 can approximate with the rotation of the first intermediate shaft 111 to maintain the needed speed to regenerate current through the MG 118.

The continued rotation of the first intermediate shaft 111 is maintained due to the continued engagement to the running prime mover or ICE.

The electric current generated from MG 118 can be used to assist the operation of MG 117 so that a level of hybrid output to the differential (via the output shaft 134) is maintained with the engine operating at a lower rpm equivalent as compared to an engine output with a transmission with a mechanically set gear ratio (non-continuously variable transmission ratio).

In transmission 100, the carrier 108 can rotate in both clockwise and counter clockwise direction by the reversible MG 117. Wherein the counter rotation to the forward drive rotation by the first carrier 108, will result in a reverse maneuver which is caused by the change in the direction of the MG rotor rotation.

The counter rotation of the carrier 108 engages the two way sprag clutch 124 in the output planetary set 102 to transmit torque through the associated fourth planetary gears 114. The engagement of the sprag clutch 124 depends on torque load from the fourth sun gear outward to the rear gear 116 in two rotational directions.

Transmission 100 in another mode of operation has the first carrier 108 being held stationary (by MG 130) as MG 118 turns the output shaft 111 to either start the engine or used as an auxiliary prime mover such that the vehicle moves on electric power from an energy storage unit. MG 118 can produce enough torque to turn the planet gears 105 and 106 to cause the rotation of the first sun gear 103 thereby transferring power to turn the engine crankshaft (not shown) via a flywheel 138.

The first intermediate shaft 111 is also torsionally connected to the output planetary set 102 through an incorporated or connected third sun gear 113 such that the rotation of the sun gear 113 causes the rotation of the third planet gear 115. The aforementioned action engages the housing ring 116 to transfer torque to the differential via the output shaft 138.

First intermediate shaft 111 acts as a prime mover for short and slow speeds such that the vehicle engine can remain switched off until a pre-determined speed is reached to start the engine. Wherein, when the engine begins to produce torque input to the transmission 100, the first intermediate shaft 111 can function as a partial prime mover providing a parallel hybrid output to the output planetary set 102.

Kinematic Arrangements:

The motion multiplicity models the torque flow enabled by the configuration of two planetary gear units 101 and 102 connected by two co-axial shafts 110 and 111. This document describes two torque transmission models using a single configuration.

Mode 1

During idling, inertia torque could build up in the transmission 100 as undesirable heat and to avoid this, a one way clutch 121 is incorporated between an input shaft 132 and the first sun gear 103 so that as the engine idles the sprag clutch 121 cannot engage in reaction to propulsion load since the carrier 108 is free to rotate.

When engine torque rotates the first sun gear 103, and for this document, the rotation is described as clockwise, the set of first and second planet gears 105 and 106 rotate anticlockwise but because they are supported on the first carrier 108, the inertia displacement of the planet gears 105 would also include revolution round the axis of the sun gears 103 and 104.

In which case, the inertia torque between the sun and planet gears, would cause the first carrier 108 to rotate in the same direction as the input source which is clockwise As long as the first carrier 108 is allowed to freely rotate, the sprag clutch 121 cannot engage to transmit torque from the engine through the transmission 100.

When a new torque to control the rotation of the first carrier 108 is introduced to hold it in a stationary position, the one way clutch 121 engages to connect the torque from the engine to the transmission 100. The above noted action causes the rotating first sun gear 103 to rotate the planet gears 105 which are mounted on a pinion that extends to a set of second planet gears 106. The second sun gear 104 is secured to the first intermediate shaft 111 and rotates in a clockwise direction. The output shaft 111 is extended and terminates with third sun gear 113 at the other end. The third 113 and fourth 112 sun gears are each meshed to a set of third and fourth planet gears 115 and 114. Planet gears 115 and 114 are secured to separate carriers 122 and 123 which are incorporated with sprag clutches 125 and 124 respectively.

As preferred in this configuration but not limited to it, the sprag clutch associated to the third planet gears 115 meshed with the output sun gear 104, is a one way clutch 125. A two way clutch 124 is associated with the co-axial second intermediate shaft and is torsionally connected to shaft 110 associated to the first carrier 108 in the input planetary unit 101.

The increasing torque as the first carrier 108 in the input planetary set 101 rotates engages the associated sprag clutch 124 in the output planetary set 102 due to the rotating inertia from the second intermediate shaft 110.

The above configuration keeps the ring gear 116 and differential (via output shaft 136) in continuous rotation even though a switch has been made from one shaft to another.

A second option is to sandwich the sprag clutch 124 and 125 between the set of planet gears 114,115 and the ring gear 116 such that, the planet gears 114,115 run on the gear teeth arrangement on the inner surface of the clutch bore and the outer ring of the clutch forms part of the ring. The carrier in this design is fixed or stationary so that when torque passes through the planet gears 114 and 115, the torque input would engage the clutch allowing the rotation of the engaged set of planet gears to directly rotate the ring 116.

The set of fourth planet gears 114 are meshed to the fourth sun gear 112 on the second intermediate shaft 110 associated with the first carrier 108 and as mentioned earlier is co-axial to the first intermediate shaft 111. As preferred in this configuration, it runs along the bore of the shaft and connected to the carrier in the input planetary set.

Again, the increasing rotation of the carrier 108 engages the second sprag clutch 124 in the output planetary set 102 as the torque through the original set is displaced by the revolving planet gears 105 and 106.

In a reverse transmission gear selection, the first carrier 108 rotation is reversed to engage the associated two way clutch 124 in the output planetary set.

Mode 2

Using the same configuration as in Mode 1 and a larger battery capacity as in conventional hybrids, this mode is designed especially for the capability of driving the vehicle solely on an electric mode from the battery while the engine is switched off. MG 118 turns the first intermediate shaft 111 so that the associated third planet gears 115, in the output planetary set 102 engages the ring gear 116 for transmission to the wheels (via output shaft 136). MG 117 is used for reverse gear function maneuver which also means that the two-way sprag clutch 124 is incorporated with the associated planetary configuration in the output planetary set 102 as further described:

When MG 118 spins the first intermediate shaft 111, the third sun gear 113 rotates the third planet gear 115 which will spin the input planet gear 105,106 and the meshed input sun gear 103. Remember, the carrier and the rotor 109 would rotate in the same direction and in keeping consistent with the previous mode, rotating anti-clockwise as a mirror rotation to the initial input source from the engine.

When the vehicle is shifted to move in reverses, the sun gear 104 will be in clockwise rotation as well as the carrier 108. The carrier 108 will be generating current from the inertia torque as it freely rotates. The engine will not be engaged due to the one way sprag clutch 121 between the input sun gear 105 and the input member.

Referring back to the vehicle as it moves in a forward direction, as the vehicle speed reaches a determined threshold, the carrier 108 is held stationary (by torque from MG 117) such that the torque from MG 118, engages the sprag clutch 121 between the first sun gear 103 and the shaft 132 to start the engine (not shown) while the vehicle is in motion.

The preferred control scheme is to ultimately reduce overall torque interruption as well as the level of energy loss heat dissipation. Torque interruption is defined as the moment of disengagement and engagement between gear shifts and the associated torque humps as well as the gradient shift mechanism or slip clutch action as in belt CVTs. The control schematics is best described as a continuous sequential torque transmission as the acting torque input from MG 117, prevents an overrun and under-run of the first carrier 108 creating a dynamic frame through varied speed levels.

The configuration is designed to respond to the kinematic displacements when torque is introduced through the transmission. The control system operates more as an enabler to optimize torque rather than getting in the way of the torque flow. The following components are utilized in the control architecture of the transmission:

Electromechanical system;
Sprag clutches; and
Transmission control unit (or integrated to the Electronic control unit—ECU).

Electromechanical System:

Two MGs 117, 118 are present in transmission 100 are connected to an inverter/capacitor. MG 117 is connected to the first carrier 108 in the planetary set 101 through the rotor 109 so as to control the rotation of the carrier 109 as well as regenerate current from the inertia torque also present in the carrier 108 at particular propulsion intervals.

In an alternative embodiment (not shown), the transmission can have a sprag clutch integrated with the first carrier 108 and first rotor 109 as part of a lock mechanism to hold the first carrier 108 stationary. The torque from the first rotor 109 would subsequently release the carrier 108 to rotate on its axis.

MG 118 is secured to the first intermediate shaft 111 associated with the second sun gear 104 meshed to the set of second planet gears 105 in the planetary set 101. It is mainly used to regenerate current from the continuous shaft rotation during torque and inertia phases. It is also used as a prime mover for full electric drive intervals as well as starting the engine while the vehicle is in motion to change the drive mode from electric to hybrid drive.

Clutches:

Transmission 100 has three sprag clutches. In an embodiment (not shown), an additional sprag clutch may be integrated with MG 117 and associated carrier 108. These off the shelf clutches are used to quickly engage and disengage two members along the common torque path.

A dual sprag clutch module is utilized in the planetary set 102 where the clutch 124 and 125 are integrated between the ring 116 and the planet gears 114 and 115.

Due to the kinematic model of the torque flow during propulsion, there is a change over or shift from gear ratio when the carrier 108 is stationary to speed ratio when the carrier 108 is rotating round its axis. This transition requires a subtle clutch actuation between the two sprag clutches in response to the torque load differential between the torque input through the transmission and the vehicle load or intended speed.

In essence, the torque through the clutch cannot lock if there is no load to react to. So instead of frictional clutch lock as in conventional transmissions, the torque input and load differential is crucial to engage either clutches to maintain a continuous transmission between the prime mover and the vehicle wheel. This however in conjunction with the function of the planetary gear unit where one member is stationary or acts as a frame to allow torque transmission.

Control Unit:

The core control architecture is designed to operate the MGs 117, 118 most especially which means a transmission with an electromechanical control system. The sprag clutches will mostly rely on the differential between the operating torque and the acting load. However, in a design where an additional electromechanical control can be integrated with the sprag clutch in the planetary set 102, the control logistics would assist engaging and disengaging the sprag clutch.

Attributes of the Invention:

The new approach to the energy circle now includes regeneration during torque and inertia phases of the transmission like a typical alternator rather than at inertia phase with conventional hybrid braking.

The energy circle strategy is to have more active current for propulsion rather than relying on stored energy in large expensive batteries.

As a result, the use of ultra-capacitors have proved very crucial even though installing a larger battery capacity for Mode 2 as explained earlier, may be an option.

A key element of this invention is the overall torque load engagement behavior which is unique to the configuration and effective to transmit over 85% torque input through the transmission compared to the conventional examples that uses frictional clutches where most of the torque input is lost through heat dissipation when the clutches are applied.

Therefore unique to this invention is the overall torque load engagement behavior enabled by the configuration of the transmission which is sensitive to the load differential between the engine output, the vehicle load and coefficient drag as well as the overall vehicle velocity.

To decelerate the vehicle, the first carrier's 108 speed can be reduced by regenerating current back to the energy storage unit.

Also to stop the vehicle, both motor generators 117, 118 can alternate to generators to stop the vehicle or reduce its speed.

During vehicle idling, the MG 117 will release the rotor 109 to allow it to rotate freely. The above action will cause the sprag clutch 121 not to engage, therefore, the transmission is disengaged from the vehicle engine during engine idling.

I claim:

1. An automotive transmission comprising:
    a first planetary gear set, said first planetary gear set including a first sun gear for unidirectional torsional connection with a prime mover, said first planetary gear set including a first planet gear mounted on a pinion connected with a first carrier;
    a first reversible motor generator having a rotor torsionally connected with said first carrier;
    a second planet gear torsionally affixed with said first planet gear;
    a second sun gear meshed with said second planet gear;
    a first intermediate shaft torsionally connected with said second sun gear;
    a second motor generator with a rotor torsionally connected with said first intermediate shaft;
    a third sun gear torsionally connected with said first intermediate shaft and torsionally connected with an output shaft via a third planet gear meshed with a ring gear via a one-way clutch;
    a second intermediate shaft torsionally connected with said first carrier and torsionally connected with said output shaft via a fourth sun gear meshed with a planet gear and via a two-way clutch with said ring gear.

2. A transmission comprising:
    an input shaft for torsional connection with an internal combustion engine via a one way clutch;
    a first sun gear torsionally connected with said input shaft;
    a first planet gear meshed with said first sun gear;
    a second planet gear torsionally affixed and coaxial with said first planet gear;
    a first carrier and a connected first pinion shaft for rotably mounting said first and second planet gears;
    a first reversible electromotive rotor torsionally connected with said first carrier;
    a first stator for electromotively interacting with said first rotor;
    a second sun gear meshed with said second planet gear;
    a first intermediate shaft having a rotational axis coaxial with said input shaft, said first intermediate shaft being torsionally affixed with said second sun gear;
    a second electromotive rotor torsionally connected with said first intermediate shaft;

a second stator for electromotively interacting with said second rotor;
a third sun gear torsionally connected with said first intermediate shaft;
a third planet gear meshed with said third sun gear;
a second carrier, said second carrier being rotatably fixed and mounting a second pinion shaft mounting said third planet gear;
a second intermediate shaft coaxial with said first intermediate shaft, said second intermediate shaft being torsionally connected with said first carrier;
a fourth sun gear connected with said second intermediate shaft;
a fourth planet gear rotatably mounted on said second carrier and meshed with said fourth sun gear;
a rear ring gear for meshing with said third and fourth planet gears;
a one-way clutch between said third planet gear and said rear ring gear;
a two-way clutch between said fourth planet gear and said rear ring gear; and
an output shaft torsionally connected with said rear ring gear.

3. A transmission comprising:
an input shaft for torsional connection with an internal combustion engine via a one way clutch;
a first sun gear torsionally connected with said input shaft;
first planet gears meshed with said first sun gear;
second planet gear torsionally affixed and coaxial with said first planet gears;
a first carrier and with connected first pinion shafts for rotably mounting said first and second planet gears;
a first reversible electromotive rotor torsionally connected with said first carrier;
a first stator for electromotively interacting with said first rotor;
a second sun gear meshed with said second planet gear;
a first intermediate shaft having a rotational axis coaxial with said input shaft, said first intermediate shaft being torsionally affixed with said second sun gear;
a second electromotive rotor torsionally connected with said first intermediate shaft;
a second stator for electromotively interacting with said second rotor;
a third sun gear torsionally connected with said first intermediate shaft;
third planet gears meshed with said third sun gear;
a second carrier, said second carrier being rotatably fixed and mounting second pinion shafts mounting said third planet gears;
a second intermediate shaft coaxial with said first intermediate shaft, said second intermediate shaft being torsionally connected with said first carrier;
a fourth sun gear connected with said second intermediate shaft;
fourth planet gears rotatably mounted on said second carrier and meshed with said fourth sun gear;
a rear ring gear for meshing with said third and fourth planet gears;
a one-way clutch between said third planet gears and said rear ring gear;
a two-way clutch between said fourth planet gears and said rear ring gear; and
an output shaft torsionally connected with said rear ring gear.

\* \* \* \* \*